United States Patent
McSchooler et al.

(12) 
(10) Patent No.: US 11,081,781 B1
(45) Date of Patent: Aug. 3, 2021

(54) CELLULAR BASE STATION KEYED CABLE CONNECTORS

(71) Applicant: DISH Wireless L.L.C., Englewood, CO (US)

(72) Inventors: Jeffrey McSchooler, Parker, CO (US); Greg Ivey, Denver, CO (US); Richard Ripp, Jr., Castle Rock, CO (US); Anand Menon, Lone Tree, CO (US)

(73) Assignee: DISH Wireless L.L.C., Englewood, CO (US)

(*) Notice: Subject to any disclaimer, the term of this patent is extended or adjusted under 35 U.S.C. 154(b) by 0 days.

(21) Appl. No.: 16/801,744

(22) Filed: Feb. 26, 2020

(51) Int. Cl.
| | |
|---|---|
| *H04Q 1/24* | (2006.01) |
| *H01Q 1/24* | (2006.01) |
| *H01Q 1/12* | (2006.01) |
| *H01R 13/64* | (2006.01) |
| *H01R 25/00* | (2006.01) |
| *H04W 88/08* | (2009.01) |

(52) U.S. Cl.
CPC .......... *H01Q 1/246* (2013.01); *H01Q 1/1242* (2013.01); *H01R 13/64* (2013.01); *H01R 25/003* (2013.01); *H04W 88/085* (2013.01)

(58) Field of Classification Search
CPC ....... H01Q 1/246; H01Q 21/28; H01Q 1/1242
See application file for complete search history.

(56) References Cited

U.S. PATENT DOCUMENTS

| | | | |
|---|---|---|---|
| 2018/0176985 A1* | 6/2018 | Hendrix | ............. H05K 7/20563 |
| 2020/0212621 A1* | 7/2020 | Meshram | ........... H01R 13/5213 |

* cited by examiner

*Primary Examiner* — Keith Ferguson
(74) *Attorney, Agent, or Firm* — Kilpatrick Townsend & Stockton LLP

(57) ABSTRACT

Various arrangements of a connection system are presented. The system can include radio cable ports. Each radio cable port may be communicatively connected with a different antenna of an antenna system. Each radio cable port may be keyed different such that only a particular keyed cable assembly can be mated with the radio cable port. The system can also include antenna cable ports. Each antenna cable port can be configured to be communicatively connected with a different radio of a radio system. Each antenna cable port may be keyed different such that only a particular keyed cable assembly can be mated with the antenna cable port. Each radio cable port is keyed in a same pattern as an antenna cable port with which the radio cable port is intended to be communicatively connected.

20 Claims, 10 Drawing Sheets

CELLULAR BASE STATION KEYED CABLE CONNECTORS

CROSS-REFERENCES TO RELATED APPLICATIONS

This application is related to U.S. patent application Ser. No. 16/801,752, filed on Feb. 26, 2020, entitled "Cellular Base Station Radio to Antenna Connection System," the entire disclosure of which is hereby incorporated by reference for all purposes.

BACKGROUND

When installing a new cellular tower or modifying a cellular tower of a base station, connections need to be made between the base station's antennas and radios, baseband unit (BBU, also referred to as a centralized unit, CU), distributed unit (DU), and/or cellular site router. The radios are typically located some distance from the antennas, such as in one or more housings located on the ground. The antennas tend to be located in an elevated position, such as atop a cellular tower. If the radios are not connected to the antennas correctly, the base station may not function properly or at all. Similarly correct connections may need to be established between other components, such as connections involving a BBU, DU, and/or cellular site router. Typically, this scenario requires a technician to return to the base station, diagnose, and correct the installation. In addition to the downtime of the cellular tower not functioning properly or at all, requiring a technician to diagnose and correct the installation can be time-consuming, especially if a significant amount of weather protective material needs to be removed and reinstalled or replaced.

SUMMARY

Various embodiments are described related to a cellular radio to cellular antenna connection system. In some embodiments, a cellular radio to cellular antenna connection is described. The system may include a plurality of radio cable ports. Each radio cable port may be configured to be communicatively connected with a different antenna of an antenna system. Each radio cable port may be keyed different such that only a particular keyed cable assembly of a plurality of keyed cable assemblies can be mated with the radio cable port. The system may include a plurality of antenna cable ports. Each antenna cable port of the plurality of antenna cable ports may be configured to be communicatively connected with a different radio of a radio system. Each antenna cable port may be keyed different such that only a particular keyed cable assembly of the plurality of keyed cable assemblies can be mated with the antenna cable port. Each radio cable port of the plurality of radio cable ports may be keyed in a same pattern as an antenna cable port of the plurality of antenna cable ports with which the radio cable port may be intended to be communicatively connected.

Embodiments of such a system may include one or more of the following features: the cellular radio to cellular antenna connection system may comprise the plurality of keyed cable assemblies. Each keyed cable assembly of the plurality of keyed cable assemblies may comprise a keyed radio connector and a keyed antenna connector. The keyed radio connector and the keyed antenna connector of each keyed cable assembly of the plurality of keyed cable assemblies may be keyed the same. Each radio cable port may comprise one or more keyed protrusions located within an outer housing. Each antenna cable port may comprise one or more keyed elements located within an outer housing. The one or more keyed protrusions of each radio cable port may be arranged in a different pattern than each other radio cable port of the plurality of radio cable ports. The radio plate assembly may comprise a radio plate. The radio plate assembly may comprise a plurality of radio port connectors attached to a first side of the radio plate. The radio plate assembly may comprise the plurality of radio cable ports attached to a second side of the radio plate opposite the first side of the radio plate. The radio plate assembly may comprise an attachment mechanism that secures the plurality of radio port connectors to a matching plurality of radio ports of the radio system. The plurality of radio port connectors may be arranged on the first side of the radio plate such that plurality of radio port connectors may mate with a plurality of radio ports of the radio system in a single orientation. The antenna plate assembly may comprise an antenna plate. The antenna plate assembly may comprise a plurality of antenna port connectors attached to a first side of the antenna plate. The antenna plate assembly may comprise the plurality of antenna cable ports attached to a second side of the antenna plate opposite the first side of the antenna plate. The antenna plate assembly may comprise an attachment mechanism that secures the plurality of antenna port connectors to a matching plurality of antenna ports of the antenna system. The plurality of antenna port connectors may be arranged on the first side of the antenna plate such that plurality of antenna port connectors may mate with the plurality of antenna ports of the antenna system in a single orientation. The system may further comprise the antenna system comprising a plurality of antennas. The system may further comprise the radio system comprising a plurality of cellular radios. The plurality of radio cable ports may be mounted on the radio system. The plurality of antenna cable ports may be mounted on the antenna system.

In some embodiments, a cellular tower plate connection system is described. The system may comprise an antenna plate assembly. The antenna plate assembly may comprise an antenna plate. The antenna plate assembly may comprise a plurality of antenna port connectors attached to a first side of the antenna plate. The system may comprise a plurality of antenna cable ports. Each antenna cable port of the plurality of antenna cable ports may be configured to be communicatively connected with a different radio of a radio system. Each antenna cable port may be keyed different such that only a particular keyed cable assembly of a first plurality of keyed cable assemblies can be mated with the antenna cable port. The plurality of antenna cable ports may be attached to a second side of the antenna plate opposite the first side of the antenna plate. A radio plate assembly may comprise a radio plate. The radio plate assembly may comprise a plurality of radio port connectors attached to a first side of the radio plate. The radio plate assembly may comprise a plurality of radio cable ports. Each radio cable port may be configured to be communicatively connected with a different antenna of an antenna system. Each radio cable port may be keyed different such that only a particular keyed cable assembly of a second plurality of keyed cable assemblies can be mated with the radio cable port. The plurality of radio cable ports may be attached to a second side of the radio plate opposite the first side of the radio plate.

Embodiments of such a system may include one or more of the following features: each radio cable port of the plurality of radio cable ports may be keyed in a same pattern as an antenna cable port of the plurality of antenna cable ports with which the radio cable port may be intended to be communicatively connected. The system may further comprise the plurality of keyed cable assemblies. Each radio cable port may comprise one or more keyed protrusions located within an outer housing. Each antenna cable port may comprise one or more keyed elements located within an outer housing. The one or more keyed protrusions of each radio cable port may be arranged in a different pattern than each other radio cable port of the plurality of radio cable ports. The antenna plate assembly may further comprise a first attachment mechanism that may secure the plurality of antenna port connectors to a matching plurality of antenna ports of the antenna system. The plurality of antenna port connectors may be arranged on the first side of the antenna plate such that the plurality of antenna port connectors may mate with the plurality of antenna ports of the antenna system in a single possible orientation. The radio plate assembly may further comprise a second attachment mechanism that secures the plurality of radio port connectors to a matching plurality of radio ports of the radio system. The plurality of radio port connectors may be arranged on the first side of the radio plate such that plurality of radio port connectors may mate with the matching plurality of radio ports of the radio system in a single orientation.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
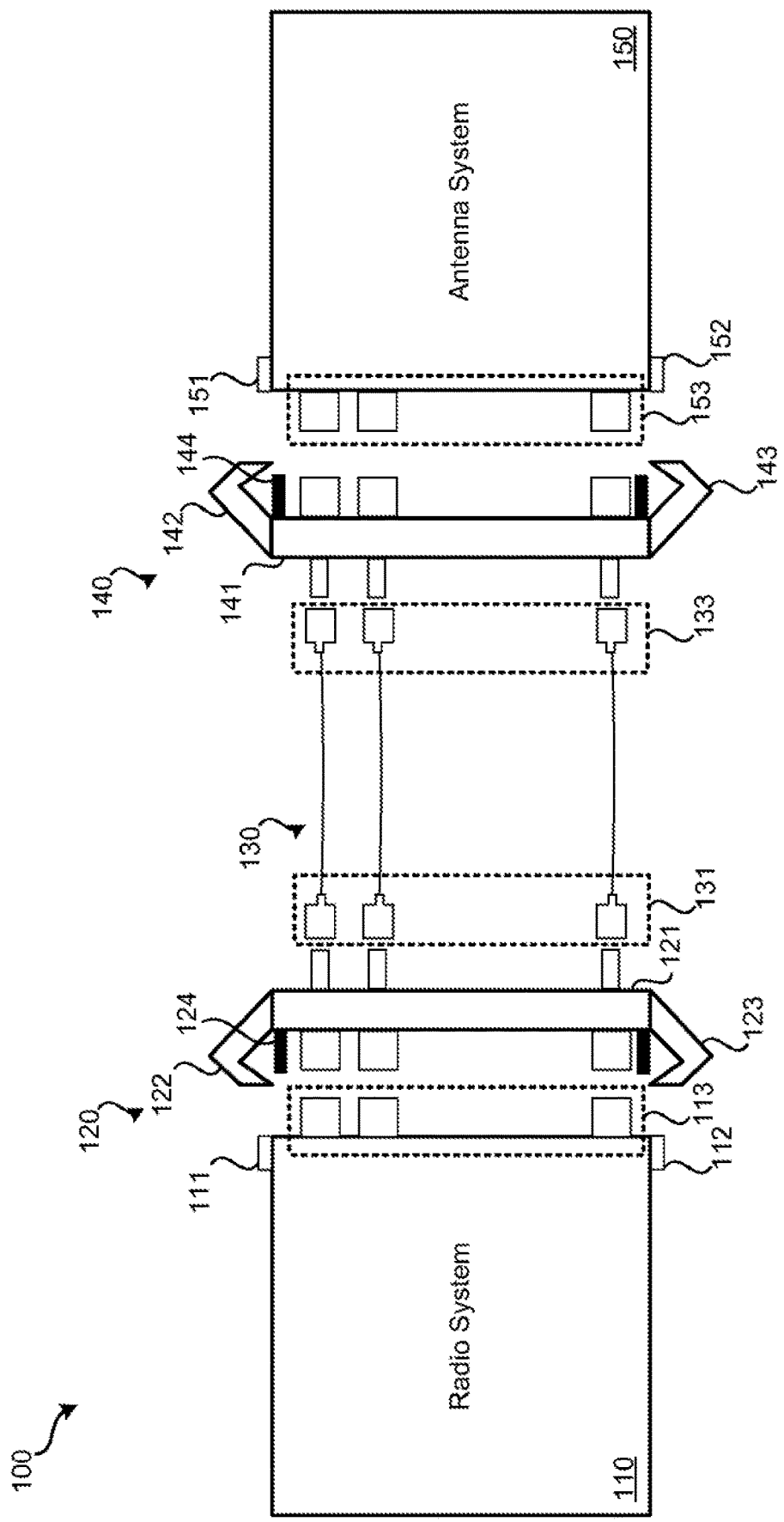
FIGS. 1A and 1B illustrate an embodiment of a cellular tower plate connection system.

Embodiments detailed herein are focused on cellular tower plate connection systems and methods for using such cellular tower plate connection systems. When a technician connects a radio system of a base station to the antennas of the base station, the technician is likely working in a hostile environment. For instance, when making connections to the antenna system, the technician may be high above the ground near the top of a cellular tower of the base station. Due to the hostile working environment, it may be relatively easy to make installation errors, such as connecting a radio of the radio system to the wrong antenna. Further, weatherproofing may be installed over the connections made to an antenna system. Removal of this weather proofing may be a messy and time-consuming process if the connections need to be corrected.

To decrease the likelihood of errors, a cellular tower plate connection system, as detailed herein, may be used. Prior to the technician climbing a cellular tower or opening a radio system, cables can be properly routed between two plate assemblies, referred to as a radio plate assembly and an antenna plate assembly. These connections can be made in a relatively convenient location, such as on the ground or at a company's facility. On site, at the base station, the technician may connect the antenna plate assembly to the antenna system. Connection of the antenna plate assembly to the antenna system may only be possible in a particular orientation, which may be particularly useful if the technician is atop a cellular tower. Therefore, it may not be possible (or may be difficult or obviously wrong) to connect the antenna plate assembly in such a way that would result in incorrect connections being made between the antenna plate assembly and the antenna system. Similarly, on site, the technician may connect the radio plate assembly to the radio system. Connection of the radio plate to the radio system may only be possible in a particular orientation (or may be obvious if done wrong or difficult to do wrong). Therefore, it may not be possible or may be difficult to connect the radio plate in such a way that would result in incorrect connections being made between the radio plate and the radio system.

Additionally or alternatively, keyed connectors may be used to help ensure the proper connections are made. Such keyed connectors may be used for connections involving: antennas, radios, BBUs, DUs, and/or cellular site routers. If an antenna plate assembly and radio plate assembly are used, keyed connectors may be used for the connections with cables running between the antenna plate assembly and the radio plate assembly. Alternatively, if an antenna plate assembly and/or a radio plate assembly are not used, keyed connectors may be used to make connections directly between the radio system and cables and/or between the antenna system and cables. Each cable assembly that is to be connected between a radio system antenna system or between a radio plate assembly and an antenna plate assembly may be keyed differently than some or all of the other cables to be similarly used. Each cable assembly may have a similarly keyed connector on each end. This connector may be keyed to only connect with a particular cable port of each plate assembly (or directly with the system). That way, the cable can be reversed and still be used to make the correct connection. By keying the individual connectors of the cable assemblies differently, it may be impossible or difficult for a technician to inadvertently make an incorrect connection between plate assemblies or directly between the radio system and antenna system.

Figure 1B:
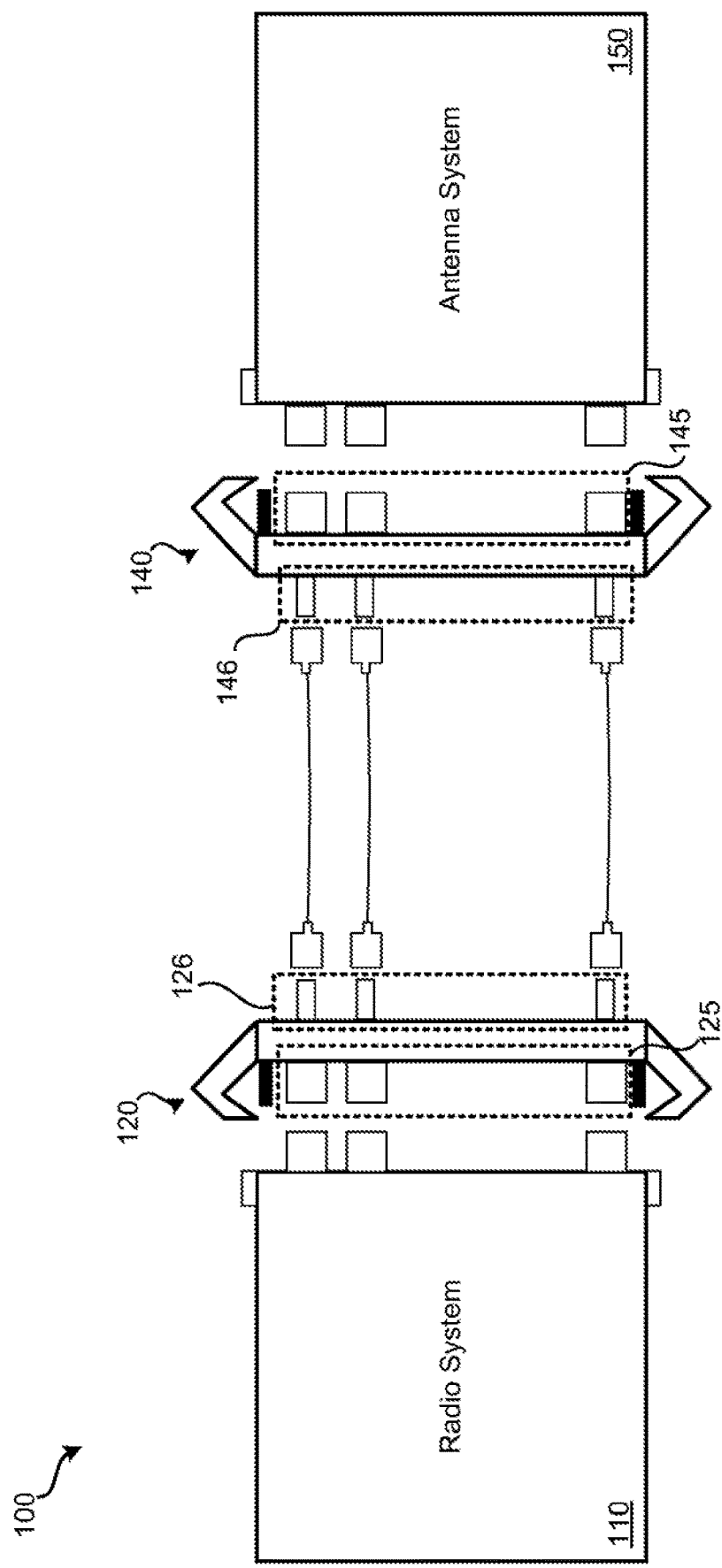

Further detail regarding such embodiments is provided in relation to the figures. FIG. 1A and FIG. 1B illustrate an embodiment of a cellular tower plate connection system 100 ("system 100"). FIGS. 1A and 1B illustrate the same embodiment of system 100. For clarity, some callouts are indicated on FIG. 1A and others are indicated on FIG. 1B.

System 100 is shown with connections between the plate assemblies, the cable assemblies, the radio system, and the antenna system disconnected. System 100 can include: radio system 110; radio plate assembly 120; cable assemblies 130; antenna plate assembly 140; and antenna system 150. Radio system 110 and antenna system 150 may be components of a cellular network base station. Antenna system 150 can include some number of antennas, which are typically located in an elevated location to improve communication with user terminals, such as atop a cellular tower. Radio system 110 may typically be located a short distance from antenna system 150, such as on the ground in a housing near the cellular tower. Radio system 110 may have multiple input and/or output radio ports 113 that are used for outputting signals and receiving input signals from antenna system 150. For example, radio ports 113 may be fiber-optic ports, coaxial ports, or some other form of optical or wired communication ports. Similarly, antenna system 150 may have multiple input and/or output ports 153 that are used for outputting signals to and receiving input signals from antenna system 150. Each of ports 153 may correspond to a particular port of radio ports 113. For example, ports 153 may be fiber-optic ports, coaxial ports, or some other form of optical or wired communication ports that match radio ports 113.

Radio plate assembly 120 can include: radio plate 121; attachment mechanism 122; attachment mechanism 123; weather seal 124; radio port connectors 125; and cable ports 126. Radio plate 121 may be a rigid or semi-rigid plate made out of materials such as plastic or metal onto or through which various connections between radio port connectors 125 and cable ports 126 are present. Radio port connectors 125 may be arranged on radio plate 121 such that radio port connectors 125 each align with a corresponding radio port of radio ports 113. Due to the position of radio port connectors 125, it may only be possible to connect radio port connectors 125 to radio ports 113 in one particular orientation. Therefore, it may not be possible for a technician to form connections between radio port connectors 125 and radio ports 113 if radio plate assembly 120 is in an incorrect orientation.

When radio plate assembly 120 is pressed onto radio ports 113, connections between radio ports 113 and radio port connectors 125 may be made simultaneously or nearly simultaneously. Further, weather seal 124 may form a barrier around radio ports 113 and radio port connectors 125. Weather seal 124 may be an O-ring that can be compressed when radio plate assembly 120 is pressed onto radio ports 113.

When connections have been formed between radio ports 113 and radio port connectors 125, some form of attachment mechanism may be engaged to hold radio plate assembly 120 in place against radio system 110. In system 100, attachment mechanism 122 latches onto protrusion 111 and attachment mechanism 123 latches onto protrusion 112. Attachment mechanisms 122 and 123 can be disengaged by a technician if radio plate assembly 120 needs to be disconnected from radio system 110. While attachment mechanisms 122 and 123 latch onto protrusions 111 and 112 in the illustrated embodiment, other forms of attachment mechanisms are possible. For example, an attachment mechanism may use one or more screw fasteners, adhesive, one or more clamps, friction-fastening, etc. to removably secure radio system 110 with radio plate assembly 120.

On a side of radio plate 121 opposite the side on which radio port connectors 125 are located, cable ports 126 may be arranged. Each cable connector of cable ports 126 may be wired to a corresponding radio port connector of radio port connectors 125. In some embodiments, a cable connector of cable ports 126 is located immediately opposite the corresponding radio port connector, which can help minimize the length of wiring through radio plate 121. Alternatively, cable ports 126 may be arranged in a different pattern or order on radio plate 121 than the corresponding radio port connectors on the opposite side.

Antenna plate assembly 140 can function largely similarly to radio plate assembly 120, however antenna plate assembly connects with antenna system 150. Therefore, the arrangement of ports on antenna plate assembly 140 matches the arrangement of antenna ports 153. Antenna plate assembly 140 can include: antenna plate 141; attachment mechanism 142; attachment mechanism 143; weather seal 144; antenna port connectors 145; and cable ports 146. Antenna plate 141 may be a rigid or semi-rigid plate made out of materials such as plastic or metal onto or through which various connections between antenna port connectors 145 and cable ports 146 are present. Antenna port connectors 145 may be arranged on antenna plate 141 such that antenna port connectors 145 each align with a corresponding antenna port of antenna ports 153. Due to the position of antenna port connectors 145, it may only be possible to connect antenna port connectors 145 to antenna ports 153 in one particular orientation. Therefore, it may not be possible for a technician to form connections between antenna port connectors 145 and antenna ports 153 if antenna plate assembly 140 is in an incorrect orientation.

When antenna plate assembly 140 is pressed onto antenna ports 153, connections between antenna ports 153 and antenna port connectors 145 may be made simultaneously or nearly simultaneously. Further, weather seal 144 may form a barrier around antenna ports 153 and antenna port connectors 145. Weather seal 144 may be an O-ring that can be compressed when antenna plate assembly 140 is pressed onto antenna ports 153. Other forms of weather seals are possible, such as using a resin or water-repellant material that can be applied by a technician.

When connections have been formed between antenna ports 153 and antenna port connectors 145, some form of attachment mechanism may be engaged to hold antenna plate assembly 140 in place against antenna system 150. In system 100, attachment mechanism 142 latches onto protrusion 151 and attachment mechanism 143 latches onto protrusion 152. Attachment mechanisms 142 and 143 can be disengaged by a technician if antenna plate assembly 140 needs to be disconnected from antenna system 150. While attachment mechanisms 142 and 143 latch onto protrusions 151 and 152 in the illustrated embodiment, other forms of attachment mechanisms are possible. For example, an attachment mechanism may use one or more screw fasteners, adhesive, one or more clamps, friction-fastening, etc. to removably secure antenna system 150 with antenna plate assembly 140.

On a side of antenna plate 141 opposite the side on which antenna port connectors 145 are located, cable ports 146 may be arranged. Each cable connector of cable ports 146 may be wired (or otherwise connected) to a corresponding antenna port connector of antenna port connectors 145. In some embodiments, a cable connector of cable ports 146 is located immediately opposite the corresponding antenna port connector, which can help minimize the length of wiring through antenna plate 141. Alternatively, cable ports 146 may be arranged in a different pattern or order on antenna plate 141 than the corresponding antenna port connectors on the opposite side.

Cable assemblies 130 can be used to connect each cable connector of cable ports 126 to a corresponding cable connector of cable ports 146. In some embodiments, each of cable ports 146 and cable ports 126 may be keyed such that only a cable keyed to that particular style connector can be fully connected to the cable connector. Such an arrangement can help prevent incorrect connections between cable ports 126 and cable ports 146. Each cable of cable assemblies 130 may include a cable that matches the types of signal (e.g., fiber optic cable for an optical signal, conductive cable for an electrical signal).

Cable ports 126 may be connected to cable connectors 131 and cable ports 146 may be connected to cable connectors 133. Each of cable connectors 131 and 133 may form a weather tight seal with the cable connector with which it is connected. Further detail regarding cable connectors 131 and 133 and cable ports 126 and 146 is presented in relation to FIG. 3.

Figure 1C:
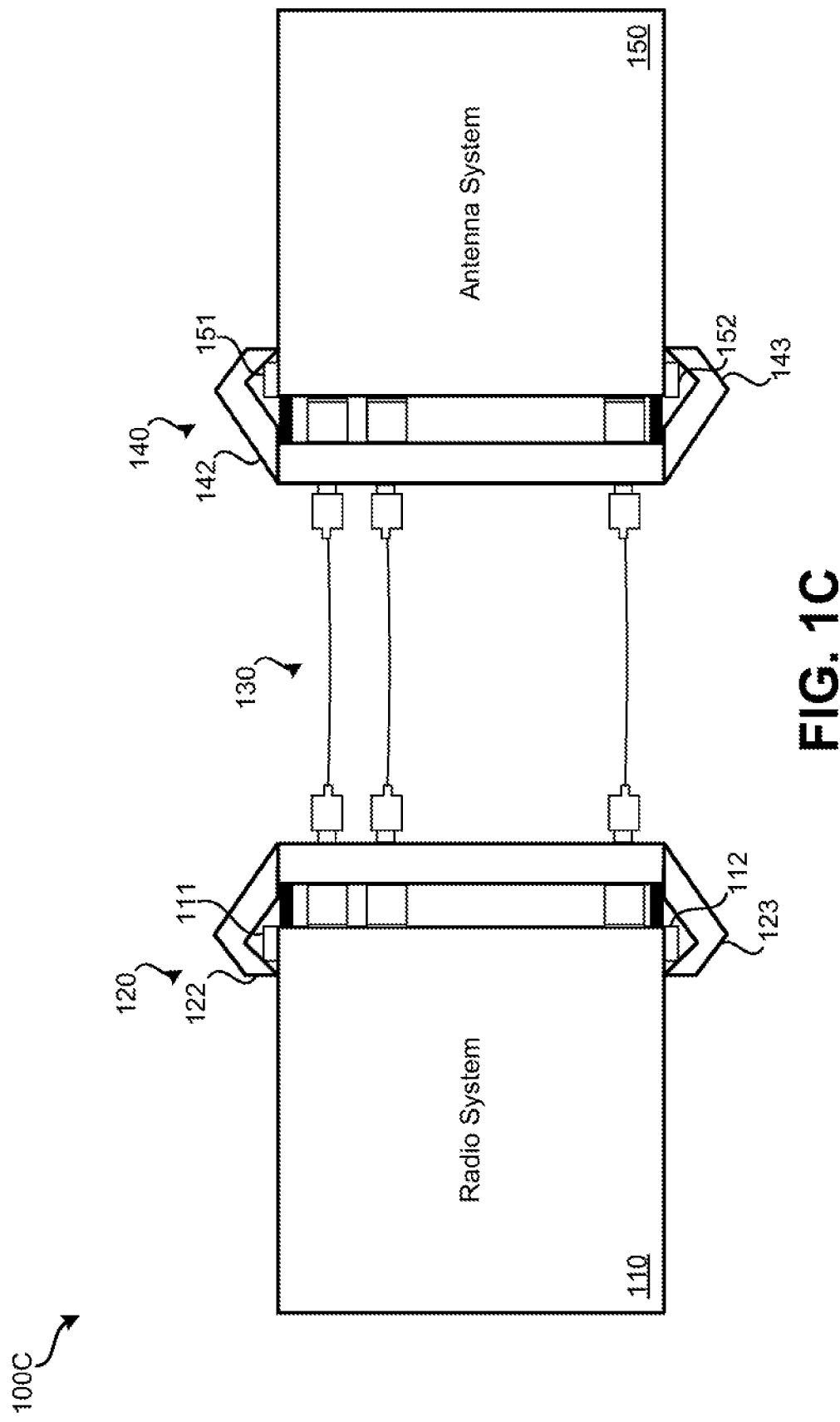
FIG. 1C illustrates an embodiment of the cellular tower plate connection system with connections made between the plate assemblies, the cable assemblies, the radio system, and the antenna system.

FIG. 1C illustrates an embodiment of the cellular tower plate connection system 100C ("system 100C") with connections made between the plate assemblies, the cable assemblies, the radio system, and the antenna system. System 100C illustrates the same embodiment as system 100, however, connections between radio system 110, radio plate assembly 120, cable assembles 130, antenna plate assembly 140, and antenna system 150 have been made. Further, attachment mechanisms 122, 123, 142, and 143 have been engaged with the corresponding protrusions of radio system 110 and antenna system 150.

Figure 2A:
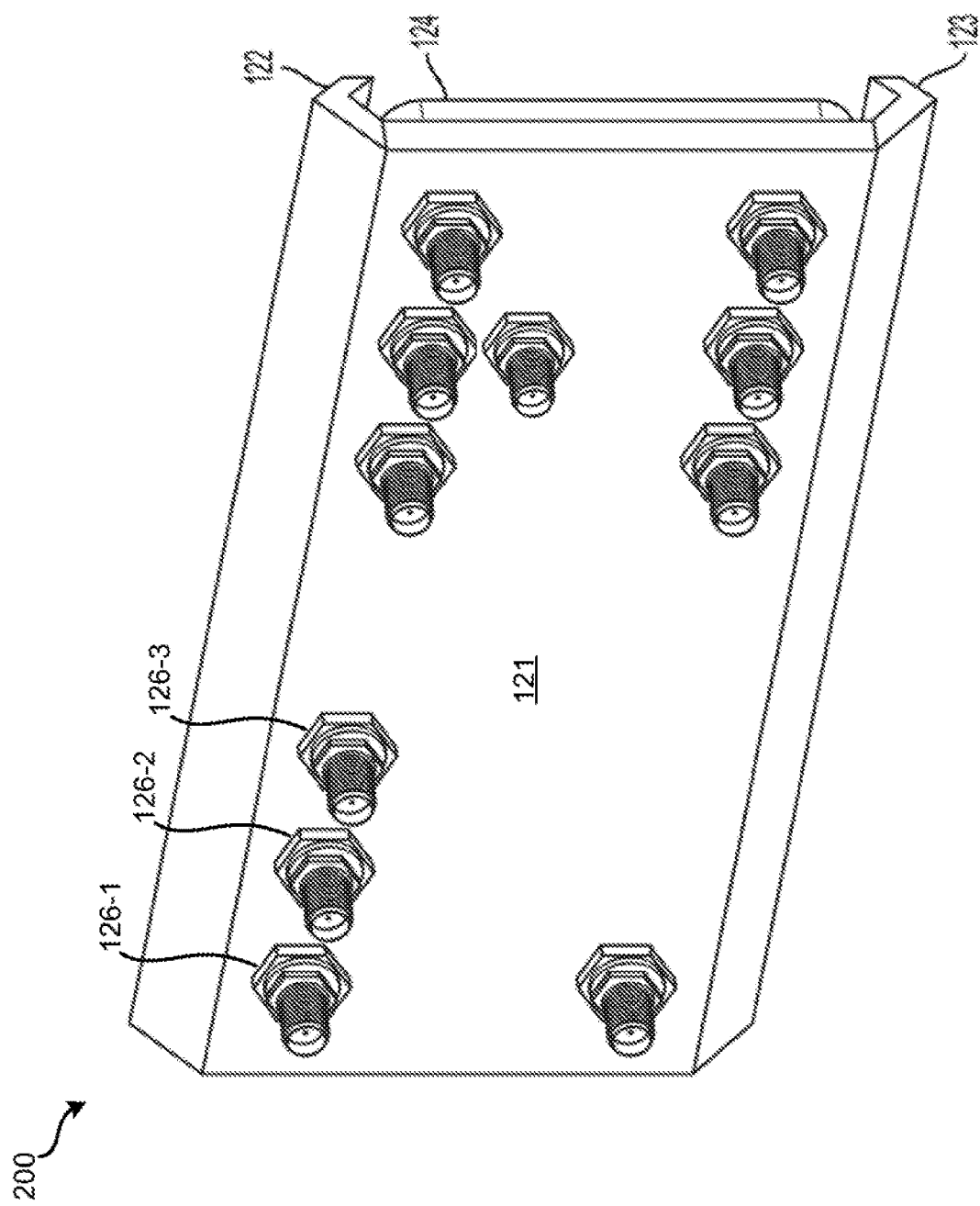
FIG. 2A illustrates an embodiment of a front of a connection plate.

FIG. 2A illustrates an embodiment of a front of plate assembly 200. Plate assembly 200 can represent an embodiment of radio plate assembly 120 or antenna plate assembly 140. For the purposes of this example, plate assembly 200 is described as a version of radio plate assembly 120. Each of cable ports 126, such as cable ports 126-1, 126-2, and 126-3, may be connected with a particular radio port connector present on the back of plate assembly 200. In some embodiments, cable ports 126 may be keyed differently from each other such that only a particular type of designated cable may be attached to each cable port of cable ports 126. Further detail regarding keyed cable ports is described in relation to FIGS. 5-10.

Figure 2B:
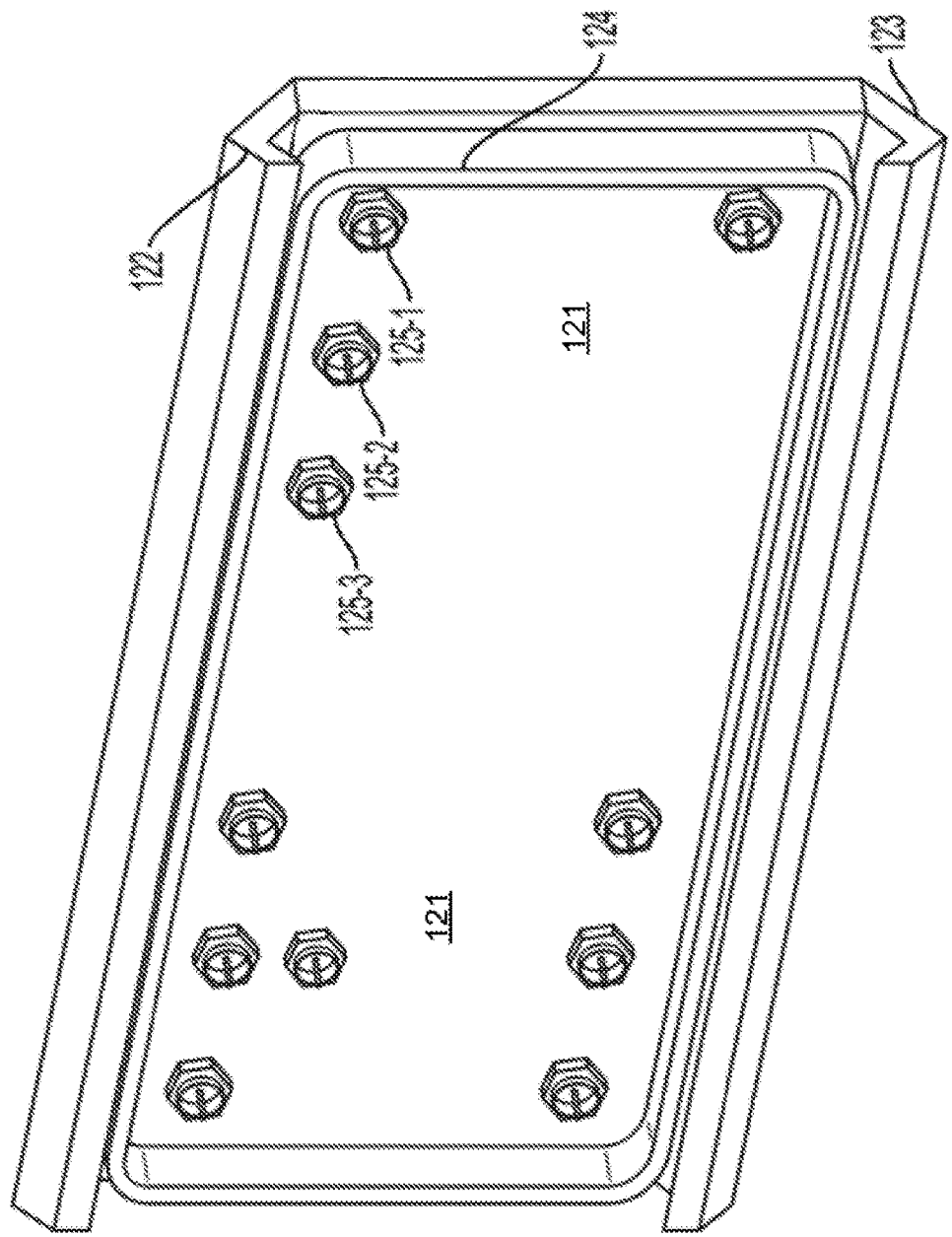
FIG. 2B illustrates an embodiment of a back of a connection plate.

FIG. 2B illustrates an embodiment of a back of plate assembly 200. As noted in relation to FIG. 2A, plate assembly 200 can represent radio plate assembly 120 or antenna plate assembly 140. For the purposes of this example, plate assembly 200 is described as radio plate assembly 120. The back of plate assembly 200 may have radio port connectors 125. Each of radio port connectors 125 may be positioned on radio plate 121 to match the location of radio ports 113 on radio system 110. Plate assembly 200 may be mated with radio system 110 such that each radio port connector of radio port connectors 125 connects or mates with a matching radio port of radio ports 113. Plate assembly 200 can be pushed against radio system 110 to connect radio port connectors 125 with radio ports 113. Further, by pushing plate assembly 200 against radio system 110, a weatherproof seal may be formed around the formed connections, such as by weather seal 124. Further, attachment mechanisms 122 and/or 123 may snap or otherwise attach with radio system 110 to hold plate assembly 200 connected with the ports of the radio system.

Figure 3:
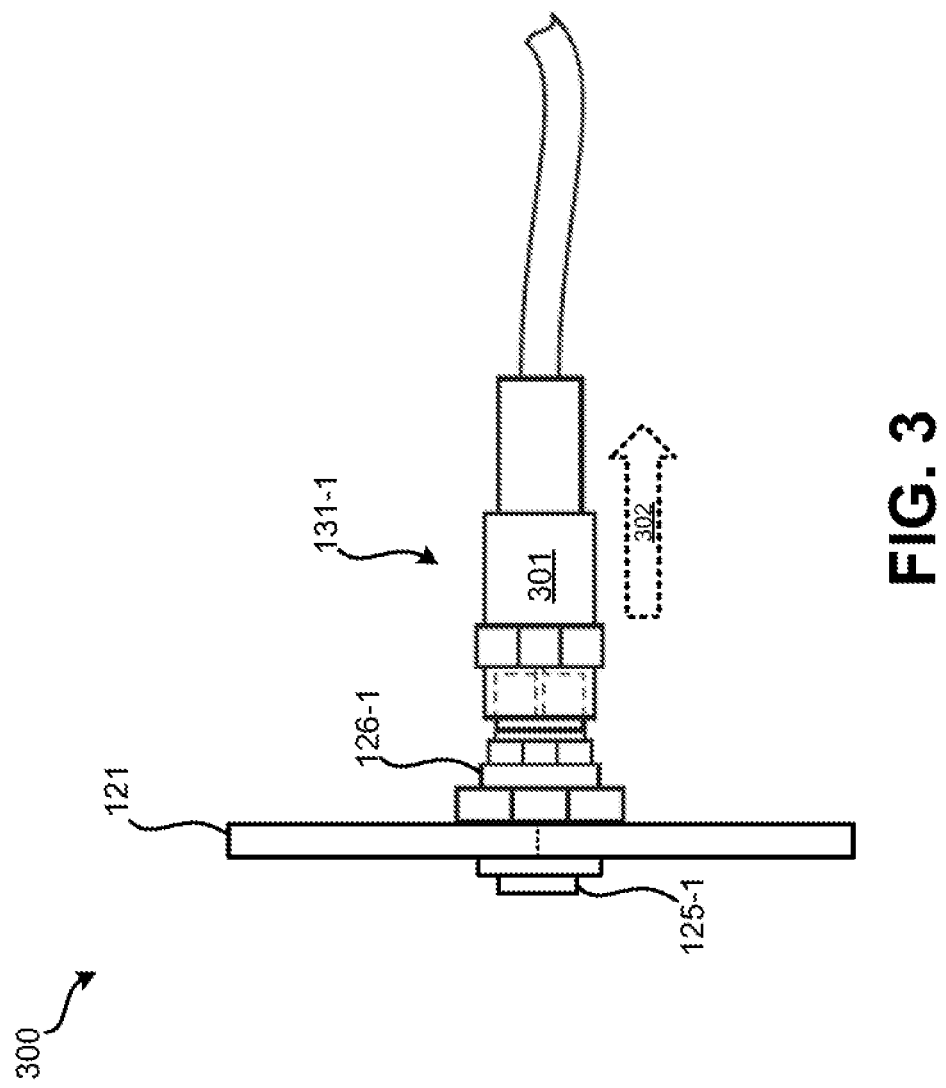
FIG. 3 illustrates an embodiment of a connection being made between a cable connector of a cable assembly and a cable port of a plate assembly.

FIG. 3 illustrates an embodiment 300 of a connection being made between a cable connector of a cable assembly and a cable port of a plate assembly. In the illustrated example, a connection is made between a cable and a cable port of a radio plate assembly. Similar cable connections may be made to an antenna plate assembly. Cable connector 131-1 may have a retractable sleeve 301. Retractable sleeve 301 may be pulled in direction 302 to allow a connection to be made or removed between cable connector 131-1 and cable port 126-1 located on radio plate 121. When in the unretracted position (to which retractable sleeve 301 may return when force is not applied to retractable sleeve 301 in direction 302), retractable sleeve 301 may help form a weathertight seal between cable connector 130-1 and cable port 126-1. While retractable sleeve 301 is in the unretracted position, cable connector 130-1 may be locked to cable port 126-1. Opposite cable port 126-1 on radio plate 121 may be radio port connector 125-1. In other embodiments, radio port connector 125-1 may be located in some other location than directly opposite cable port 126-1 on radio plate 121. The design of cable connector 131-1 is merely representative; in other embodiments, alternative or additional styles of cable connectors may be used for some or all of cable connectors 131 and cable connectors 133.

Figure 4:
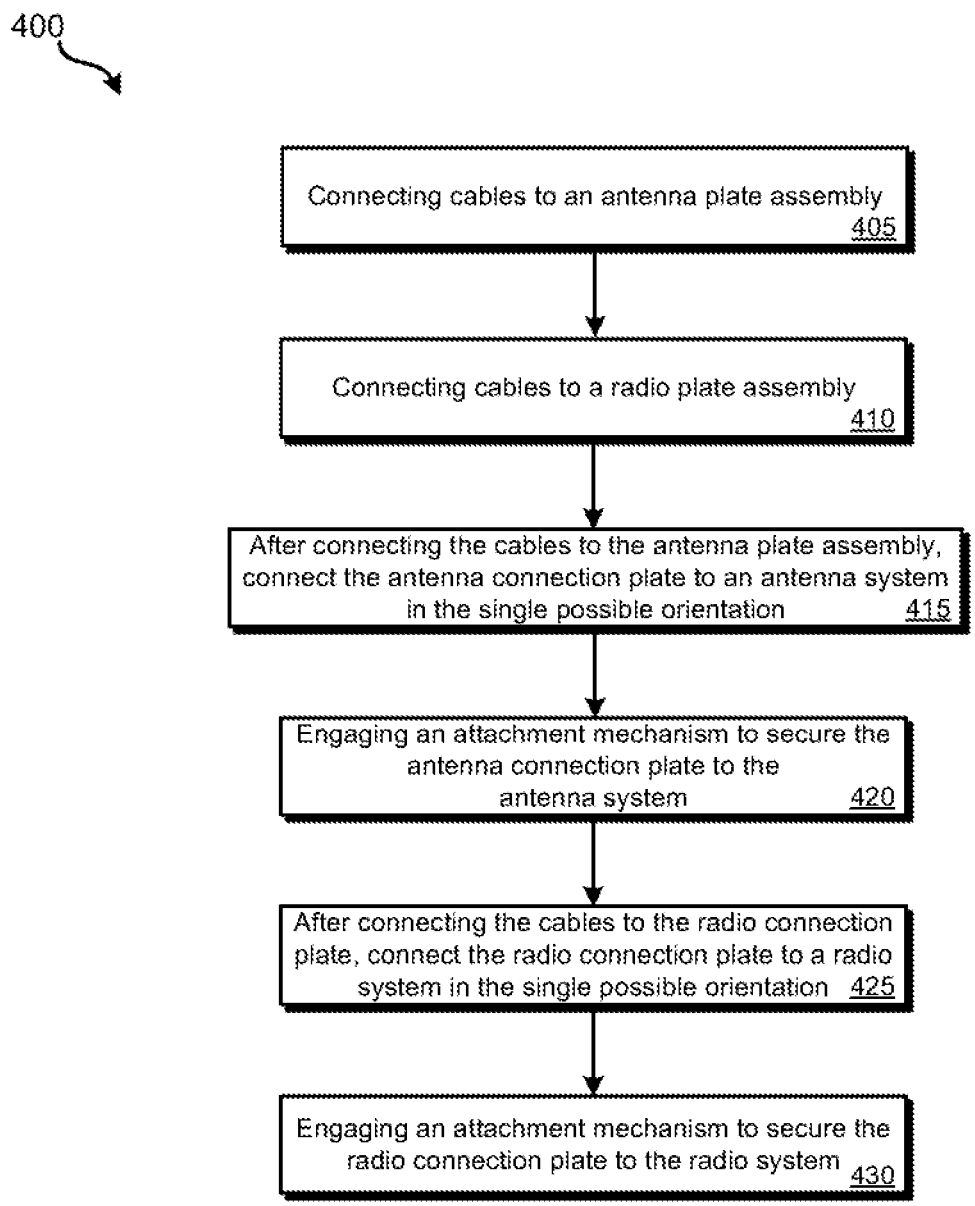
FIG. 4 illustrates an embodiment of a method for using a cellular tower plate connection system.

Various methods may be performed using the systems and devices detailed in relation to FIGS. 1A-3. FIG. 4 illustrates an embodiment of a method 400 for using a cellular tower plate connection system. Method 400 may be performed using system 100 of FIGS. 1A and 1B. At block 405, multiple cables may be connected to the cable connectors of the antenna plate assembly. Such connections may be performed in a relatively technician-friendly environment, such as on the ground or at a facility. In some embodiments, each connection may be keyed such that a particular cable may only be connected with a particular cable connector of the antenna plate assembly. Prior to, during, or after block 405 is performed, block 410 may be performed. At block 410, the multiple cables may be connected to the cable connectors of the radio plate assembly. Such connections may be performed in a relatively technician-friendly environment, such as on the ground or at a facility. In some embodiments, each connection may be keyed such that a particular cable may only be connected with the correct cable connector of the radio plate assembly.

Block 415 may be performed after block 405. Notably, however, block 415 may be performed before block 410. At block 415, after the cables have been connected to the antenna plate assembly, the antenna plate assembly may be connected with the antenna system. Block 415 may be performed in a relatively hostile environment, such as atop a cellular tower where the antenna system is located. Only a single possible orientation may allow the antenna plate assembly to successfully mate with the ports of the antenna system. Alternatively, if multiple orientations are possible, the technician may only need to ensure that the antenna plate assembly is properly oriented to ensure that all connections with the antenna system are correct. When block 415 is performed, multiple connections between ports of the antenna system and port connectors of the antenna plate assembly may be made simultaneously or nearly simultaneously. At block 420, an attachment mechanism or more than one attachment mechanism may be engaged to secure the antenna connection plate to the antenna system. This can include engaging a clasp, a bracket, a screw-based fastener, or using an adhesive.

Block 425 may be performed after block 410. Notably, however, block 425 may be performed before block 405. At block 425, after the cables have been connected to the radio plate assembly, the radio plate assembly may be connected with the radio system. Only a single possible orientation may allow the radio plate assembly to successfully mate with the ports of the radio system. Alternatively, if multiple orientations are possible, the technician may only need to ensure that the radio plate assembly is properly oriented to ensure that all connections with the radio system are correct. When block 425 is performed, multiple connections between ports of the radio system and port connectors of the radio plate assembly may be made simultaneously or nearly simultaneously. At block 430, an attachment mechanism or more than one attachment mechanism may be engaged to secure the radio connection plate to the radio system. This can include engaging a clasp, a bracket, a screw-based fastener, or using an adhesive.

As previously mentioned, certain connections may be keyed to prevent incorrect connections from being inadvertently made. The following keyed cable ports and keyed cable connectors may be used in conjunction with the antenna plate assemblies and radio plate assemblies described in relation to FIGS. 1A-4. Alternatively, the keyed cable ports and keyed cable connectors described herein may also be used in embodiments that do not use the antenna plate assemblies and radio plate assemblies described in relation to FIGS. 1A-4. In such environments, the keyed cable ports may be installed directly as part of the antenna systems and radio systems and may be used to connect with the keyed cable connectors of various cable assemblies. While the following examples are focused on connections between antennas and radios and antenna plate assemblies and radio plate assemblies, other embodiments of keyed connectors can include connections between antennas, radios, BBUs, DUs, and/or cellular site routers.

Figure 5:
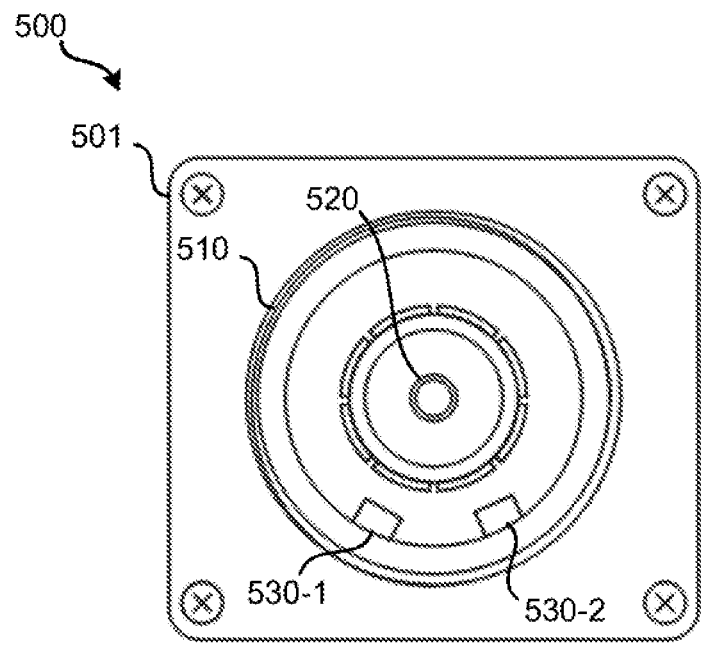
FIG. 5 illustrates an embodiment of a keyed cable port.
Figure 6:
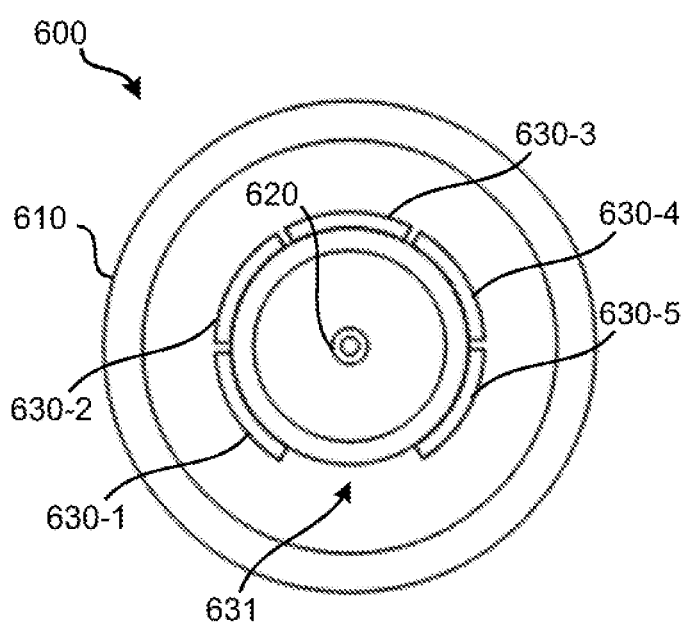
FIG. 6 illustrates an embodiment of a keyed cable connector.

FIGS. 5 and 6 illustrate a first pair of a keyed cable port and a keyed cable connector that can be connected together. FIG. 5 illustrates an embodiment of a keyed cable port 500. Keyed cable port 500 can, for example, be used in place of the (non-keyed) cable port 126-1 of plate assembly 200. Again, as previously detailed, plate assembly 200 can be a radio plate assembly or an antenna plate assembly. Alternatively, if plate assemblies are not being used, keyed cable port 500 can be used as a port of radio ports 113 or antenna ports 153.

Keyed cable port 500 can include baseplate 501; outer port cover 510; signal carrier 520; and keyed protrusions 530. Baseplate 501 may be fastened, such as by using screws, to a plate assembly, such as plate assembly 200 of FIG. 2A, or directly to a system, such as radio system 110. Outer port cover 510 may serve to physically connect with an outer covering of a keyed cable connector. Signal carrier 520 may be configured to receive an electrical or optical signal. Signal carrier 520 may, for example, receive a tip of an optical cable or an electrical conductor.

Arranged around an inner portion of outer port cover 510 may be some number of keyed protrusions 530. In the example of keyed cable port 500, two keyed protrusions are present: 530-1 and 530-2. In other embodiments, fewer or greater numbers of keyed protrusions 530 may be present. Keyed protrusions 530 may be arranged in a pattern that is only present in a single cable port of the cable ports on a particular system or plate assembly. For example, only a single cable port of cable ports 126 may be keyed according to the pattern formed by keyed protrusions 530 on keyed cable port 500. A cable port of cable ports 146 may be keyed according to the same pattern formed by keyed protrusions 530. Therefore, ports intended to be connected together may be keyed the same.

FIG. 6 illustrates an embodiment of a keyed cable connector 600. Keyed cable connector 600 is designed to be able to connect with keyed cable port 500 but not connect with other cable ports keyed differently. Keyed cable connector 600 can include: outer connector cover 610; signal carrier 620; and key interference protrusions 630. Outer connector cover 610 may be sized in order to removably slide or screw onto outer port cover 510. Signal carrier 620 may be sized in order to connect with signal carrier 520. Therefore, for optical cabling, a fiber-optic connection may be formed between signal carrier 520 and signal carrier 620. For electrical cabling, electrical connection may be formed between signal carrier 520 and signal carrier 620.

Keyed cable connector 600 may be attached to the end of the cable. For example, a cable assembly of cable assemblies 130 may include a first instance of keyed cable connector 600 on a first end of the cable and a second instance of keyed cable connector 600 on the second end of the cable. If the same style keyed cable connector is used on both ends of the cable, the cable may therefore be reversible.

Keyed cable connector 600 can include a number of key interference protrusions 630 or, more generally, some form of physical element that allows mating with only a particular style of cable port. For keyed cable connector 600, key interference protrusions 630-1, 630-2, 630-3, 630-4, and 630-5 may be present. A gap 631 may be present. The presence of gap 631 in the arrangement of key interference protrusions 630 may permit keyed cable connector 600 to be fully connected with keyed cable port 500. Gap 631 in key interference protrusions 630 provides for space for keyed protrusions 530.

Figure 7:
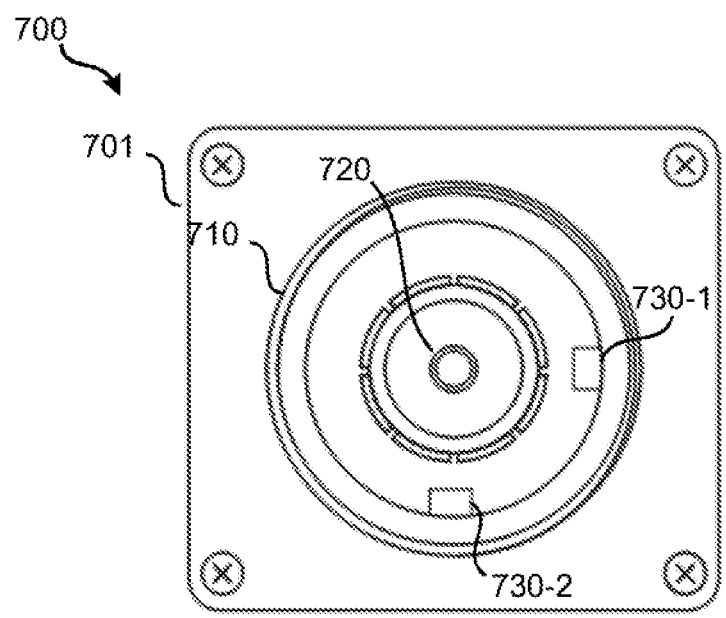
FIG. 7 illustrates an embodiment of a keyed cable port.
Figure 8:
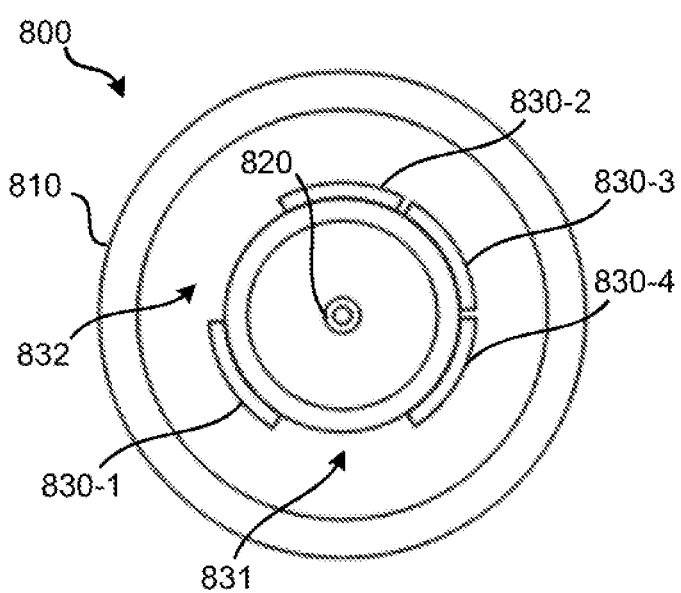
FIG. 8 illustrates an embodiment of a keyed cable connector.

FIGS. 7 and 8 illustrate a second pair of a keyed cable port and a keyed cable connector that can be connected together. FIG. 7 illustrates an embodiment of a keyed cable port 700. Keyed cable port 700 can, for example, be used in place of the (non-keyed) cable port 126-2 of plate assembly 200. Again, as previously detailed, plate assembly 200 can be a radio plate assembly or an antenna plate assembly. Alternatively, if plate assemblies are not being used, keyed cable port 700 can be used as a port of radio ports 113 or antenna ports 153.

Keyed cable port 700 has similar components to keyed cable port 500 of FIG. 5. Keyed cable port 700 can include baseplate 701; outer port cover 710; signal carrier 720; and keyed protrusions 730. Baseplate 701 may be fastened, such as by using screws, to a plate assembly, such as plate assembly 200 of FIG. 2A, or directly to a system, such as radio system 110. Outer port cover 710 may serve to physically connect with an outer covering of a keyed cable connector. Signal carrier 720 may be configured to receive an electrical or optical signal. Signal carrier 720 may, for example, receive a tip of an optical cable or an electrical conductor.

Arranged around an inner portion of outer port cover 710 may be some number of keyed protrusions 730. In the example of keyed cable port 700, two keyed protrusions are present: 730-1 and 730-2. In other embodiments, fewer or greater numbers of keyed protrusions 730 may be present. Keyed protrusions 730 may be arranged in a pattern that is only present in a single cable port of the cable ports on a particular system or plate assembly. Notably, keyed protrusions 730 are arranged in a different pattern than keyed protrusions 530, which results in a differently keyed cable connector being needed to form a connection.

Only a single cable port of cable ports 126 may be keyed according to the pattern formed by keyed protrusions 730 on keyed cable port 700. A cable port of cable ports 146 may be keyed according to the same pattern formed by keyed protrusions 730. Therefore, ports intended to be connected together may be keyed the same.

FIG. 8 illustrates an embodiment of a keyed cable connector 800. Keyed cable connector 800 is designed to be able to connect with keyed cable port 700 but not connect with other cable ports keyed differently, such as keyed cable port 500. Keyed cable connector 800 can include: outer connector cover 810; signal carrier 820; and key interference protrusions 830. Outer connector cover 810 may be sized in order to removably slide or screw onto outer port cover 710. Signal carrier 820 may be sized in order to connect with signal carrier 720. Therefore, for optical cabling, a fiber-optic connection may be formed between signal carrier 720 and signal carrier 820. For electrical cabling, electrical connection may be formed between signal carrier 720 and signal carrier 820.

Keyed cable connector 800 may be attached to the end of the cable. For example, a cable assembly of cable assemblies 130 may include a first instance of keyed cable connector 800 on a first end of the cable and a second instance of keyed cable connector 800 on the second end of the cable. If the same style keyed cable connector is used on both ends of the cable, the cable may therefore be reversible.

Keyed cable connector 800 can include a number of key interference protrusions 830. For keyed cable connector 800, interference protrusions 830-1, 830-2, 830-3, and 830-4 may be present. Gaps 831 and 832 may be present. The presence of gaps 831 and 832 in the arrangement of key interference protrusions 830 may permit keyed cable connector 800 to be fully connected with keyed cable port 700. Gap 831 in key interference protrusions 830 provides for space for keyed protrusion 730-2. Gap 832 in key interference protrusions 830 provides for space for keyed protrusion 730-1. Keyed interference protrusion 830-1 may fit between keyed protrusions 730-1 and 730-2.

Figure 9:
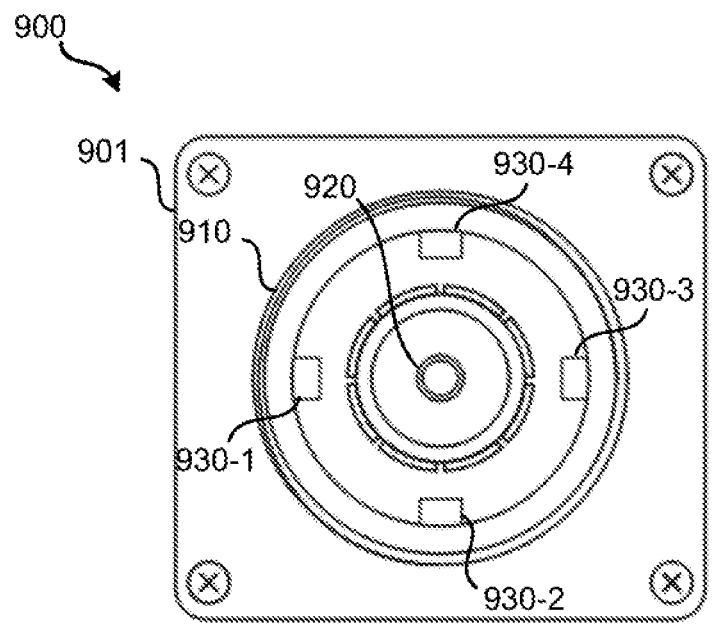
FIG. 9 illustrates an embodiment of a keyed cable port.
Figure 10:
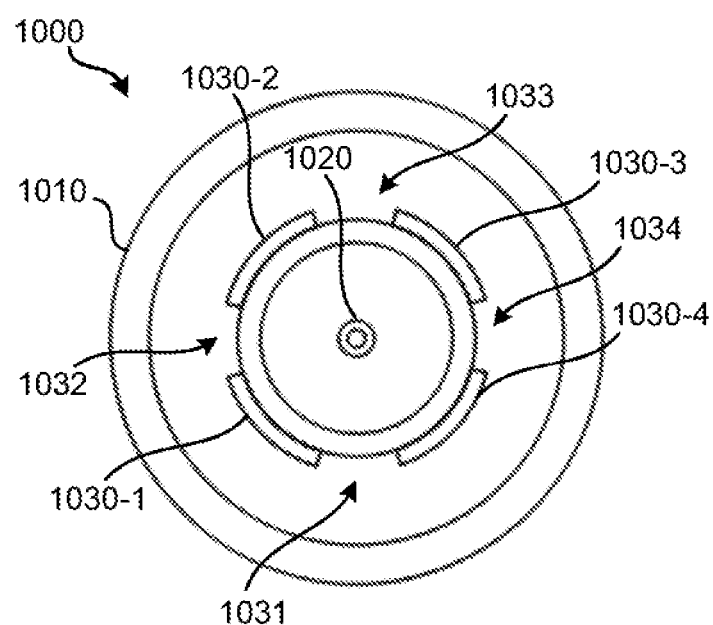
FIG. 10 illustrates an embodiment of a keyed cable connector.

FIGS. 9 and 10 illustrate a third pair of a keyed cable port and a keyed cable connector that can be connected together. FIG. 9 illustrates an embodiment of a keyed cable port 900. Keyed cable port 900 can, for example, be used in place of the non-keyed cable port 126-3 of plate assembly 200. Again, as previously detailed, plate assembly 200 can be a radio plate assembly or an antenna plate assembly. Alternatively, if plate assemblies are not being used, keyed cable port 900 can be used as a port of radio ports 113 or antenna ports 153.

Keyed cable port 900 has similar components to keyed cable port 500 of FIG. 5 and keyed cable port 700 of FIG. 7. Keyed cable port 900 can include baseplate 901; outer port cover 910; signal carrier 920; and keyed protrusions 930. Baseplate 901 may be fastened, such as by using screws, to a plate assembly, such as plate assembly 200 of FIG. 2A, or directly to a system, such as radio system 110. Outer port cover 910 may serve to physically connect with an outer covering of a keyed cable connector. Signal carrier 920 may be configured to receive an electrical or optical signal. Signal carrier 920 may, for example, receive a tip of an optical cable or an electrical conductor.

Arranged around an inner portion of outer port cover 910 may be some number of keyed protrusions 930. In the example of keyed cable port 900, four keyed protrusions are present: 930-1, 930-2, 930-3, and 930-4. In other embodiments, fewer or greater numbers of keyed protrusions 930 may be present. Keyed protrusions 930 may be arranged in a pattern that is only present in a single cable port of the cable ports on a particular system or plate assembly. Notably, keyed protrusions 930 are arranged in a different pattern than keyed protrusions 530 and keyed protrusions 730, which results in a differently keyed cable connector being needed to form a connection.

Only a single cable port of cable ports 126 may be keyed according to the pattern formed by keyed protrusions 930 on keyed cable port 900. A cable port of cable ports 146 may be keyed according to the same pattern formed by keyed protrusions 930. Therefore, ports intended to be connected together may be keyed the same.

FIG. 10 illustrates an embodiment of a keyed cable connector 1000. Keyed cable connector 1000 is designed to be able to connect with keyed cable port 900 but not connect with other cable ports keyed differently, such as keyed cable port 500 of FIG. 5 or keyed cable port 700 of FIG. 7. Keyed cable connector 1000 can include: outer connector cover 1010; signal carrier 1020; and key interference protrusions 1030. Outer connector cover 1010 may be sized in order to removably slide or screw onto outer port cover 910. Signal carrier 1020 may be sized in order to connect with signal carrier 920. Therefore, for optical cabling, a fiber-optic connection may be formed between signal carrier 920 and signal carrier 1020. For electrical cabling, electrical connection may be formed between signal carrier 920 and signal carrier 1020.

Keyed cable connector 1000 may be attached to the end of the cable. For example, a cable assembly of cable assemblies 130 may include a first instance of keyed cable connector 1000 on a first end of the cable and a second instance of keyed cable connector 1000 on the second of the cable. If the same style keyed cable connector is used on both ends of the cable, the cable may therefore be reversible.

Keyed cable connector 1000 can include a number of key interference protrusions 1030. For keyed cable connector 1000, key interference protrusions 1030-1, 1030-2, 1030-3, and 1030-4 may be present. Gaps 1031, 1032, 1033, and 1034 may be present. The presence of gaps 1031-1034 in the arrangement of key interference protrusions 1030 may permit keyed cable connector 1000 to be fully connected with keyed cable port 900. Gap 1031 in key interference protrusions 1030 provides for space for keyed protrusion 930-2. Gap 1032 in key interference protrusions 1030 provides for space for keyed protrusion 930-3. Gap 1033 in key interference protrusions 1030 provides for space for keyed protrusion 930-4. Gap 1034 in key interference protrusions 1030 provides for space for keyed protrusion 930-1.

The remaining cable connectors of a system or plate assembly may be similarly each keyed differently to prevent incorrect connections. It should be understood that the specific keying patterns, locations of connectors, locations of ports, numbers of connectors, and numbers of ports are merely examples. The specific designs of the ports and connectors can vary by embodiment. Further, in some embodiments, a design similar to the keyed cable connectors may instead be attached to the plate assemblies and a design similar to the keyed cable ports may be used as part of a cable assembly.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A cellular radio to cellular antenna connection system, comprising:
    a plurality of radio cable ports, wherein:
        each radio cable port is configured to be communicatively connected with a different antenna of an antenna system; and
        each radio cable port is keyed different such that only a particular keyed cable assembly of a plurality of keyed cable assemblies can be mated with the radio cable port;
    a plurality of antenna cable ports, wherein:
        each antenna cable port of the plurality of antenna cable ports is configured to be communicatively connected with a different radio of a radio system; and
        each antenna cable port is keyed different such that only a particular keyed cable assembly of the plurality of keyed cable assemblies can be mated with the antenna cable port; and
        each radio cable port of the plurality of radio cable ports is keyed in a same pattern as an antenna cable port of the plurality of antenna cable ports with which the radio cable port is intended to be communicatively connected.

2. The cellular radio to cellular antenna connection system of claim 1, further comprises the plurality of keyed cable assemblies.

3. The cellular radio to cellular antenna connection system of claim 2, wherein each keyed cable assembly of the plurality of keyed cable assemblies comprises a keyed radio connector and a keyed antenna connector.

4. The cellular radio to cellular antenna connection system of claim 3, wherein the keyed radio connector and the keyed antenna connector of each keyed cable assembly of the plurality of keyed cable assemblies are keyed the same.

5. The cellular radio to cellular antenna connection system of claim 4, wherein:
    each radio cable port comprises one or more keyed protrusions located within an outer housing; and
    each antenna cable port comprises one or more keyed elements located within an outer housing.

6. The cellular radio to cellular antenna connection system of claim 5, wherein the one or more keyed protrusions of each radio cable port are arranged in a different pattern than each other radio cable port of the plurality of radio cable ports.

7. The cellular radio to cellular antenna connection system of claim 1, further comprising a radio plate assembly, wherein the radio plate assembly comprises:
    a radio plate;
    a plurality of radio port connectors attached to a first side of the radio plate;
    the plurality of radio cable ports attached to a second side of the radio plate opposite the first side of the radio plate; and
    an attachment mechanism that secures the plurality of radio port connectors to a matching plurality of radio ports of the radio system.

8. The cellular radio to cellular antenna connection system of claim 7, wherein the plurality of radio port connectors are arranged on the first side of the radio plate such that plurality of radio port connectors mate with a plurality of radio ports of the radio system in a single orientation.

9. The cellular radio to cellular antenna connection system of claim 1, further comprising an antenna plate assembly, wherein the antenna plate assembly comprises:
    an antenna plate;
    a plurality of antenna port connectors attached to a first side of the antenna plate;
    the plurality of antenna cable ports attached to a second side of the antenna plate opposite the first side of the antenna plate; and
    an attachment mechanism that secures the plurality of antenna port connectors to a matching plurality of antenna ports of the antenna system.

10. The cellular radio to cellular antenna connection system of claim 9, wherein the plurality of antenna port connectors are arranged on the first side of the antenna plate such that plurality of antenna port connectors mate with the plurality of antenna ports of the antenna system in a single orientation.

11. The cellular radio to cellular antenna connection system of claim 9, wherein the plurality of radio cable ports are mounted on the radio system.

12. The cellular radio to cellular antenna connection system of claim 11, wherein the plurality of antenna cable ports are mounted on the antenna system.

13. The cellular radio to cellular antenna connection system of claim 1, further comprising:
    the antenna system comprising a plurality of antennas; and
    the radio system comprising a plurality of cellular radios.

14. A cellular tower plate connection system, comprising:
    an antenna plate assembly comprising:
        an antenna plate;
        a plurality of antenna port connectors attached to a first side of the antenna plate;
    a plurality of antenna cable ports, wherein:
        each antenna cable port of the plurality of antenna cable ports is configured to be communicatively connected with a different radio of a radio system;
        each antenna cable port is keyed different such that only a particular keyed cable assembly of a plurality of keyed cable assemblies can be mated with the antenna cable port; and the plurality of antenna cable ports are attached to a second side of the antenna plate opposite the first side of the antenna plate; and a radio plate assembly comprising:
  a radio plate;
  a plurality of radio port connectors attached to a first side of the radio plate;
  a plurality of radio cable ports, wherein:
    each radio cable port is configured to be communicatively connected with a different antenna of an antenna system; and
    each radio cable port is keyed different such that only a particular keyed cable assembly of the plurality of keyed cable assemblies can be mated with the radio cable port; and
  the plurality of radio cable ports are attached to a second side of the radio plate opposite the first side of the radio plate.

15. The cellular tower plate connection system of claim 14, wherein each radio cable port of the plurality of radio cable ports is keyed in a same pattern as an antenna cable port of the plurality of antenna cable ports with which the radio cable port is intended to be communicatively connected.

16. The cellular tower plate connection system of claim 15, further comprises the plurality of keyed cable assemblies.

17. The cellular tower plate connection system of claim 16, wherein:
  each radio cable port comprises one or more keyed protrusions located within an outer housing; and
  each antenna cable port comprises one or more keyed elements located within an outer housing.

18. The cellular tower plate connection system of claim 17, wherein the one or more keyed protrusions of each radio cable port are arranged in a different pattern than each other radio cable port of the plurality of radio cable ports.

19. The cellular tower plate connection system of claim 14, the antenna plate assembly further comprising:
  a first attachment mechanism that secures the plurality of antenna port connectors to a matching plurality of antenna ports of the antenna system, wherein:
    the plurality of antenna port connectors are arranged on the first side of the antenna plate such that the plurality of antenna port connectors mate with the plurality of antenna ports of the antenna system in a single possible orientation.

20. The cellular tower plate connection system of claim 14, the radio plate assembly further comprising:
  a second attachment mechanism that secures the plurality of radio port connectors to a matching plurality of radio ports of the radio system, wherein:
    the plurality of radio port connectors are arranged on the first side of the radio plate such that plurality of radio port connectors mate with the matching plurality of radio ports of the radio system in a single orientation.

* * * * *